(12) United States Patent
Retnamony et al.

(10) Patent No.: US 10,931,585 B2
(45) Date of Patent: *Feb. 23, 2021

(54) DATA FLOW CONTROL FOR DUAL ENDED TRANSMISSION CONTROL PROTOCOL PERFORMANCE ENHANCEMENT PROXIES

(71) Applicant: Global Eagle Entertainment Inc., Los Angeles, CA (US)

(72) Inventors: Shadrach Benny Retnamony, Miramar, FL (US); Luis Carrion Echevarria, Colindres (ES)

(73) Assignee: Global Eagle Entertainment Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/654,964

(22) Filed: Oct. 16, 2019

(65) Prior Publication Data
US 2020/0053009 A1 Feb. 13, 2020

Related U.S. Application Data

(63) Continuation of application No. 15/969,613, filed on May 2, 2018, now Pat. No. 10,536,382.
(Continued)

(51) Int. Cl.
*H04L 12/801* (2013.01)
*H04L 12/841* (2013.01)
(Continued)

(52) U.S. Cl.
CPC ....... *H04L 47/193* (2013.01); *H04B 7/18582* (2013.01); *H04L 5/0055* (2013.01);
(Continued)

(58) Field of Classification Search
CPC ... H04B 7/18582; H04L 1/1848; H04L 47/10; H04L 47/193; H04L 47/283; H04L 47/29;
(Continued)

(56) References Cited

U.S. PATENT DOCUMENTS 6,741,555 B1 * 5/2004 Li ........................... H04L 47/10
370/229
7,082,467 B2 * 7/2006 Border .................... H04L 43/00
709/227
(Continued)

FOREIGN PATENT DOCUMENTS

CA 2473863 A1 * 5/2003 ........... H04L 47/193
WO WO-03043288 A1 * 5/2003 ........... H04L 69/163

OTHER PUBLICATIONS

Floyd et al., TCP Friendly Rate Control (TFRC): Protocol Specification, Sep. 2008, Internet Engineering Task Force, Request for Comment (RFC) 5348 (accessed at https://tools.ietf.org/html/rfc5348 on Aug. 24, 2020) (Year: 2008).*
(Continued)

*Primary Examiner* — Eric Nowlin
(74) *Attorney, Agent, or Firm* — SoCal IP Law Group LLP; Jonathan Pearce; Angelo Gaz

(57) ABSTRACT

Systems, methods, and servers for controlling data flow across a computer network having a first performance enhancing proxy device (PEP1) between a client-facing segment of the network and a second PEP device (PEP2) on a server-facing segment of the network. PEP2 has a receiver for receiving flow control information from across a control channel between PEP1 and PEP2, for each TCP connection on the client-facing segment. The information includes round-trip packet latency (Li) on the client-facing segment and transmit buffer congestion information of PEP1. PEP2 has a determiner for determining if a TCP connection has a congested packet flow; and a congestion reliever for relieving such congestion by synchronizing a receive buffer of the PEP2 to be the same size as a transmit buffer congestion window of the PEP1; and delaying acknowledgments
(Continued)

(ACKs) at PEP2 by a time Tack based on a preset threshold level Tlim or Li.

12 Claims, 6 Drawing Sheets

Related U.S. Application Data

(60) Provisional application No. 62/501,236, filed on May 4, 2017.

(51) Int. Cl.
*H04L 12/823* (2013.01)
*H04L 12/835* (2013.01)
*H04B 7/185* (2006.01)
*H04L 5/00* (2006.01)
*H04L 29/08* (2006.01)

(52) U.S. Cl.
CPC ............ *H04L 47/283* (2013.01); *H04L 47/29* (2013.01); *H04L 47/30* (2013.01); *H04L 47/323* (2013.01); *H04L 67/28* (2013.01)

(58) Field of Classification Search
CPC ....... H04L 47/30; H04L 47/323; H04L 69/16; H04L 69/161; H04L 69/163; H04L 69/165; H04L 69/166; H04L 69/326; H04L 69/329
See application file for complete search history.

(56) References Cited

U.S. PATENT DOCUMENTS

| | | | | |
|---|---|---|---|---|
| 7,161,978 | B2* | 1/2007 | Lu | H04L 49/90 375/219 |
| 7,181,667 | B2* | 2/2007 | Argyropoulos | H04L 49/90 370/232 |
| 7,417,993 | B1* | 8/2008 | Ebergen | H04L 49/901 370/230 |
| 7,447,235 | B2* | 11/2008 | Luby | H03M 13/6547 341/107 |
| 7,916,640 | B1* | 3/2011 | Bishara | H04L 47/27 370/235 |
| 8,379,535 | B2* | 2/2013 | Chen | H04L 65/80 370/252 |
| 8,458,567 | B2* | 6/2013 | Luby | H04L 69/163 714/774 |
| 8,675,486 | B2* | 3/2014 | Friedman | H04L 47/39 370/235 |
| 9,130,991 | B2* | 9/2015 | Hughes | H04L 69/22 |
| 9,185,045 | B1* | 11/2015 | Yang | H04L 47/34 |
| 9,380,635 | B2* | 6/2016 | Chisu | H04W 80/06 |
| 9,386,128 | B2* | 7/2016 | Ehsan | H04L 47/283 |
| 9,565,162 | B2* | 2/2017 | Kim | H04L 63/0209 |
| 9,578,537 | B2* | 2/2017 | Park | H04W 28/02 |
| 9,924,383 | B2* | 3/2018 | Ko | H04L 1/0009 |
| 10,021,034 | B2* | 7/2018 | Hong | H04L 45/24 |
| 10,397,124 | B2* | 8/2019 | Atli | H04L 47/11 |
| 2002/0133596 | A1* | 9/2002 | Border | H04L 12/66 709/227 |
| 2003/0123394 | A1* | 7/2003 | Neale | H04L 69/161 370/235 |
| 2003/0131079 | A1* | 7/2003 | Neale | H04L 69/165 709/220 |
| 2004/0064577 | A1* | 4/2004 | Dahlin | H04L 69/329 709/235 |
| 2004/0073678 | A1* | 4/2004 | Border | H04L 45/306 709/227 |
| 2005/0058131 | A1* | 3/2005 | Samuels | H04L 41/00 370/389 |
| 2005/0213586 | A1* | 9/2005 | Cyganski | H04L 47/27 370/395.41 |
| 2005/0226272 | A1* | 10/2005 | Luby | H04L 69/16 370/473 |
| 2006/0062142 | A1* | 3/2006 | Appanna | H04L 45/04 370/219 |
| 2006/0133281 | A1* | 6/2006 | Witherell | H04L 47/193 370/238 |
| 2006/0146831 | A1* | 7/2006 | Argyropoulos | H04L 49/90 370/394 |
| 2006/0262724 | A1* | 11/2006 | Friedman | H04B 7/18582 370/235 |
| 2007/0008884 | A1* | 1/2007 | Tang | H04L 47/283 370/230 |
| 2007/0133418 | A1* | 6/2007 | Agarwal | H04L 69/24 370/236 |
| 2008/0037420 | A1* | 2/2008 | Tang | H04L 1/1607 370/229 |
| 2008/0049624 | A1* | 2/2008 | Ray | H04L 45/245 370/241 |
| 2009/0144601 | A1* | 6/2009 | Luby | H04L 69/16 714/774 |
| 2009/0316579 | A1* | 12/2009 | Tang | H04L 69/163 370/231 |
| 2010/0020689 | A1* | 1/2010 | Tang | H04L 47/10 370/235 |
| 2010/0153804 | A1* | 6/2010 | Cai | H04L 1/1858 714/748 |
| 2012/0243410 | A1* | 9/2012 | Vedula | H04L 41/5025 370/235 |
| 2012/0290727 | A1* | 11/2012 | Tivig | H04L 69/16 709/227 |
| 2013/0176854 | A1* | 7/2013 | Chisu | H04W 80/06 370/241 |
| 2014/0204837 | A1* | 7/2014 | Park | H04L 27/2666 370/328 |
| 2015/0365378 | A1* | 12/2015 | Kim | H04L 63/1408 726/13 |
| 2016/0021016 | A1* | 1/2016 | Haramaty | H04L 47/30 370/235 |
| 2016/0044670 | A1* | 2/2016 | Ko | H04L 1/0009 370/336 |
| 2016/0094467 | A1* | 3/2016 | Hong | H04L 63/0281 370/235 |
| 2018/0205656 | A1* | 7/2018 | Atli | H04L 47/11 |
| 2018/0287952 | A1* | 10/2018 | Barber | H04L 47/2466 |

OTHER PUBLICATIONS

Border et al., Performance Enhancing Proxies Intended to Mitigate Link-Related Degradations, Jun. 2001, Internet Engineering Task Force (IETF), Request for Comment (RFC) 3135 (accessed at https://tools.ietf.org/html/rfc5348 on Aug. 24, 2020) (Year: 2001).*
Osada et al., Throughput Optimization in TCP with a Performance Enhancing Proxy, Nov. 27, 2006, IEEE, 2006 International Conference on Communication Technology, DOI: 10.1109/ICCT.2006.341898 (Year: 2006).*
Kim et al., Fairness PEP Solution for Satellite TCP, Jul. 7, 2015, IEEE, 2015 Seventh International Conference on Ubiquitous and Future Networks, DOI: 10.1109/ICUFN.2015.7182504 (Year: 2015).*
European Patent Office, European Search Report for European Application No. 18170803.3, dated Sep. 7, 2018, 8 total pages.
ETSI: "Satellite Earth Stations and Systems (SES); Broadband Satellite Multimedia (BSM); Performance Enhancing Proxies (PEPs)", ETSI TR 102 676 V1.1.1, Nov. 1, 2009, XP5516493, 42 total pages.

* cited by examiner

DATA FLOW CONTROL FOR DUAL ENDED TRANSMISSION CONTROL PROTOCOL PERFORMANCE ENHANCEMENT PROXIES

RELATED APPLICATION INFORMATION

This application is a continuation of U.S. patent application Ser. No. 15/969,613 entitled DATA FLOW CONTROL FOR DUAL ENDED TRANSMISSION CONTROL PROTOCOL PERFORMANCE ENHANCEMENT PROXIES, filed May 2, 2018, which claims the benefit of U.S. Provisional Patent Application No. 62/501,236, filed May 4, 2017, all of which are incorporated by reference herein.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to controlling data traffic flow between dual ended transmission control protocol (TCP) performance enhancement proxies (PEPs).

Description of the Related Art

Internet Protocol (IP), is the principal communications protocol in the Internet protocol suite for relaying datagrams across network boundaries of the Internet. IP enables the delivery of packets from the source host to the destination host solely based on the IP addresses in the packet headers. IP defines packet structures that encapsulate the data to be delivered. It also defines addressing methods that are used to label the datagram with source and destination information. Transmission Control Protocol (TCP) is another one of the fundamental protocols of the Internet Protocol suite. TCP provides reliable, ordered, and error-checked delivery of a stream of octets between applications running on hosts communicating by an IP network. The suite or combination of IP and TCP is commonly referred to as TCP/IP.

Networks of the Internet may include local area networks (LANs) which may connect the computers in a limited area such as a building such as using Ethernet and Wi-Fi technologies. The networks may also include wide area networks (WANs) which can connect computers and LANs over a large geographic distance such as using telecommunications network, computer network, leased line, cellular and/or satellite communication technology. In one sense, the Internet is a giant WAN.

The data capacity of a data link between two computers connected over one or more of such networks can be described by a bandwidth-delay product (BDP), which is the product of a data link's data bandwidth capacity (e.g., BW, typically, in some multiple of bits per second) and its round-trip delay time (e.g., RTT, in seconds). A link can be fat (high BW) or thin (low BW) and may also be short (low RTT) or long (high RTT). Links that are fat and long have the highest BDP. Examples of high BDP transmission links are those across satellites or enterprise wide area networks (WANs) that include intercontinental optical fiber links. This is because the connections that join the endpoints of these networks may be quite "fat," but the distances travelled by the data is quite "long" resulting in higher BDP. Satellite connections in particular have inherently high RTT due to the process of transmitting the signal out into space and back down to the Earth.

Because satellite connections are high BDP, a user reliant upon these connections may have a negative browsing, application or other network-related experience due to the extended delays, no matter the available bandwidth (which is usually quite large in satellite connections). In satellite and other high BDP data links, overcoming these high RTT delays to provide a better experience for users would be beneficial.

Figure 1:
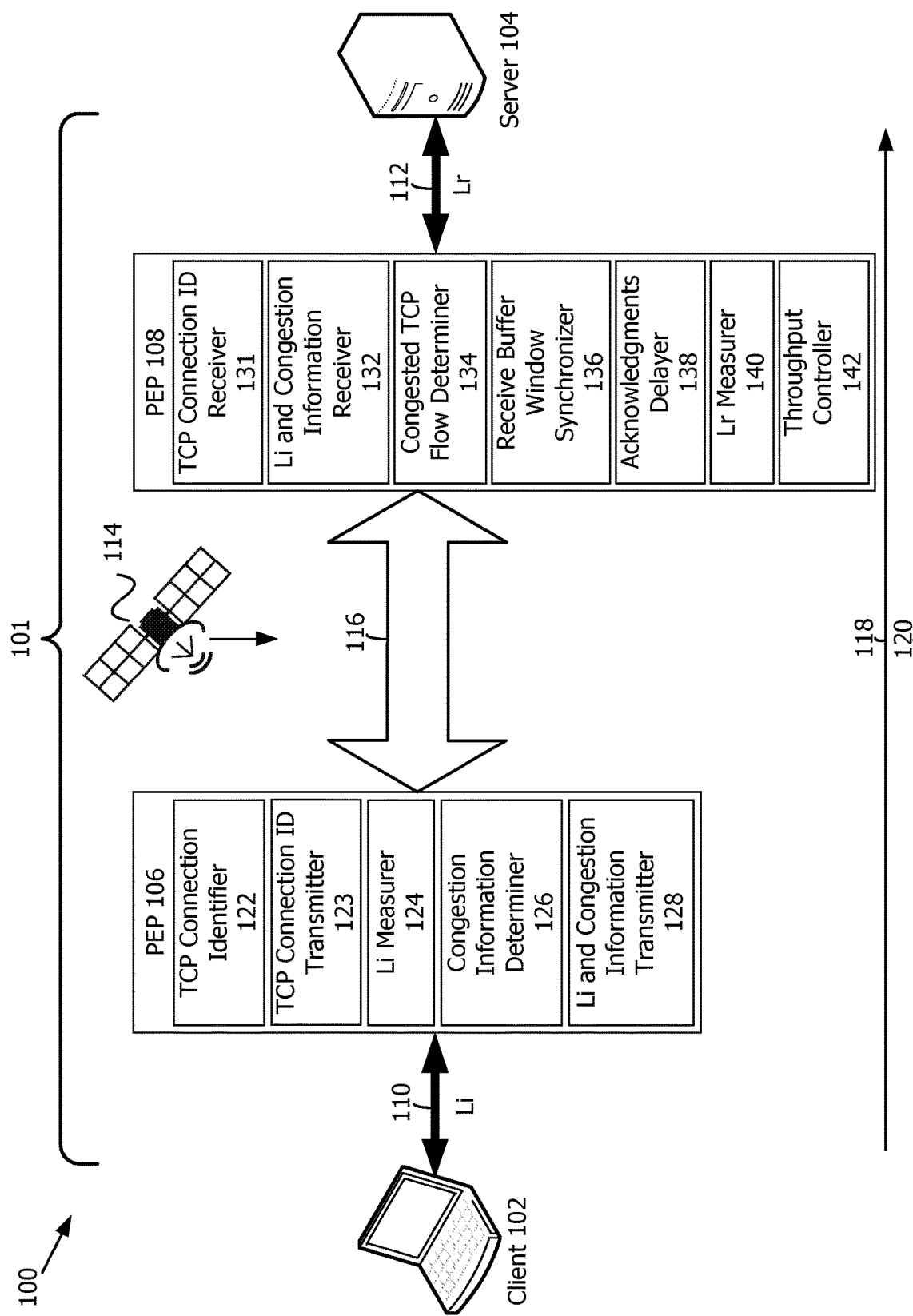
FIG. 1 is a block diagram of a system 100 for improving data flow control between dual ended transmission control protocol (TCP) performance enhancement proxies (PEPs).

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

To overcome transmission control protocol (TCP) performance issues, including high round-trip delay time (RTT) delays, some high bandwidth-delay product (BDP) wide area network (WAN) data links or circuits use TCP performance enhancement proxies (PEPs). The PEPs may be deployed as components at one end as a "single ended PEP" or both ends as a "dual ended PEPs" of a data link or "data plane." TCP PEP components can intercept TCP data traffic to mitigate the effect of packet loss in the WAN on TCP performance.

With dual ended PEP implementations, each TCP connection between a data source and data destination link may be split into three independent connections or "segments". One segment is a connection between a first computer (e.g., a data source) and a first PEP, a second segment is a connection between the first and a second PEP, and a third segment is a connection between the second PEP and a second computer (e.g., the data destination). TCP flow control for the entire TCP connection can be handled via PEP data buffer overflow and underflow techniques. There are various implementations of PEP, but all generally attempt to step into the shoes of at least one of the endpoints to better manage the flow of data so that neither side is overwhelmed or time wasted. As a result, proper data flow control in the data plane by the TCP PEPs can reduce packet losses and reduce high RTT delays.

However, managing TCP flow control in TCP PEP connection environments using buffers can result in traffic burstiness, application timeouts, and WAN bandwidth management challenges. For example, no matter how well the PEP attempts to manage the connection, the characteristics of the connections may be such that even the PEP at either end experiences long delays in receipt of data and suddenly receives a large volume of data. Packets are inherently lost in transmission and, due to the RTT delay, re-requesting those packets takes time and that may be still further delayed by the PEPs at either end of the connection. These delays cause poor application performance when applications rely upon receipt of data on a regular basis. And, long delays followed by bursts of data are difficult to handle for the PEP and either endpoint. Current flow control may rely on back pressure created by buffer overflows which cause traffic to be bursty and unpredictable. Sometimes buffer bloating causes a TCP sender to disconnect session due to zero windowing. Improved mechanisms for TCP flow control in TCP PEP environments would be helpful.

If the transmit and receive buffers of both the sending device and the receiving device could be better-synchronized across a high RTT delay network, then the overall transmission process could be better managed. This would result in a better experience for the end user and less strain and bandwidth overhead necessary for both ends of a given high RTT delay connection.

Description of Apparatus

Referring now to FIG. 1, a block diagram of components of a system 100 for improving data flow control between dual ended transmission control protocol (TCP) performance enhancement proxies (PEPs) is shown. In some case, system 100 includes components of a data network 101. Data network 101 may include a client 102, a server 104, a first performance enhancing proxy device (PEP) 106, a second performance enhancing proxy device (PEP) 108, a client-facing segment 110, a server facing segment 112, and a high BDP segment 116. In this case, segment 116 is shown as a satellite link 114.

As used herein, "client-facing segment" means the segment of the PEP on the network 101 that is closest to the device requesting the content from the network. At any given moment, the "client-facing segment" may change, depending on the particular network needs. So, for example, in an HTTP request, the "client-facing segment" may be a mobile device or laptop computer connected to the network 101. However, in some cases a server 104 on the other end of the network 101 may require data from the client 102 in order to continue its operations or a particular process. In such a case, the "client-facing segment" may change, temporarily or for a given moment to the server 104 side of FIG. 1. In such a case, FIG. 1 need not actually change. Instead, the client 102 and the server 104 merely change places temporarily and may change back immediately or at some point in the near future.

Likewise, the "server-facing segment" means the segment of the PEP on the network 101 that is closest to the device from which the content is requested from the network 101. As with the client-facing segment, this may change from time to time. Nonetheless, the processes described herein are done with a view that one device is the client-facing segment while another is the server-facing segment for purposes of ease of understanding of the system and methods described herein.

Network 101 is shown including data link 118 extending from client 102 to server 104. It also includes data link 120 extending from server 104 and client 102. Data links 118 and 120 include PEP 108, segment 116 and PEP 106 of network 101 as shown—meaning that data transmitted from the server 104 to the client passes through those data links 118, 120 and PEPs 106 and 108 and segment 116 of the network 101.

The network 101, segment 110, segment 116 and segment 112 may each be or include a local area network, a wide area network, one or more satellite connections, a personal area network, a mobile or telephone network, the Internet, an intranet, or any combination of these. They may have physical layers and transport layers according to IEEE 802.11, Ethernet or other wireless or wire-based communication standards and protocols such as WiMax®, Bluetooth®, mobile telephone and data protocols, the public switched telephone network, a proprietary communications network, infrared, and optical.

Figure 6:
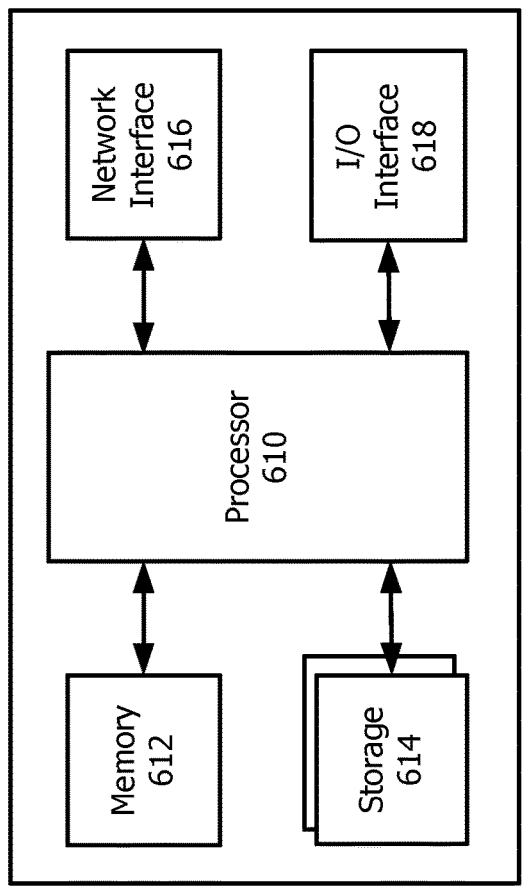
FIG. 6 is an example block diagram of a computing device 600 that may incorporate embodiments of the present invention.

Client 102 is a computing device, as shown in FIG. 6. Client 102 may be a client computer or other network device communicating with server 104 by sending data though data link 118 and receiving data from data link 120. In some cases, client 102 may be or include a desktop computer, a hand-held device, a laptop or other portable computer, a mobile phone, a personal digital assistant (PDA), a smartphone, a touchpad and the like. It may have Internet access through an Internet browser.

Server 104 is a computing device, as shown in FIG. 6. Server 104 may be a server computer or other network device communicating with client 102 by sending data though data link 120 and receiving data from data link 118. In some cases, server 104 may store data (e.g., large amounts of data, sometimes called "content"), such as web pages, documents, emails, files, images, audio and/or video data and the like to be sent to a user device, such as a client like client 102. Accordingly, the PEP 108 and PEP 106 may communicate with the server 104 to provide the large amounts of data to the different users of the user devices.

Data link 120 may use different channel, circuitry, logic or hardware than link 118 when link 120 is used to send data from server 104 to client 102. Through link 120, server 104 may send the data to client 102. Data link 120 may receive smaller amounts of data such as requests for the large amounts of data and acknowledgements (ACKs) that confirm receipt of the received data from client 102 from link 118.

For example, in response to receiving data, client 102 it may use data link 120 to return acknowledgements (ACKs) that confirm receipt of the received data. An ACK may be or include a positive "acknowledgement" of receipt by client 102 of a specific message sent by server 104 over the link 120. ACKs may be used by the components of network 101 to coordinate or synchronize data communications between server 104 and client 102. In some cases, one ACK can be used to acknowledge receipt of more than one specific message received by client 102 from server 104, such as when the ACK is delayed and confirms receipt of two or more specific messages sent by server 104 over the link 120.

PEP 106 is a computing device, as shown in FIG. 6. PEP 106 may be a proxy computer, server or PEP network device that is in network 101 between client 102 and segment 116 as shown. It may be part of links 118 and 120. In some cases, PEP 106 may be or include a router (or node), which may include storage to cache the data as it propagates through network 101 (e.g., see the receive and transmit buffers of PEP 106 shown in FIG. 2). PEP 106 may also be communicatively coupled with PEP 108 and may be configured to transmit to PEP 108 via link 118 requests received from users for accessing content via client 102.

PEP 108 is a computing device, as shown in FIG. 6. PEP 108 may be a proxy computer, server or PEP network device that is in network 101 between server 104 and segment 116 as shown. It may be part of links 118 and 120. In some cases, PEP 108 may be or include a router (or node), which may include storage to cache the data as it propagates through network 101 (e.g., see the receive and transmit buffers of PEP 108 shown in FIG. 2). PEP 108 may also be communicatively coupled with PEP 106. It may be configured to process requests received from PEP 106 for accessing the data requested by client 102, and send the requested data to the client via link 120. In some cases, PEPs 106 and 108 may collaborate with other components and routers of segment 116 to route requests, the large amounts of data and flow control information between PEPs 106 and 108.

Server-facing segment 112 may be a network data communication link between server 104 and PEP 108. Client client-facing segment 110 may be a network data communication link between client 102 and PEP 106. Segments 110 and 112 may be or include a wired and/or a wireless network. Also, segment 116 may be a wireless network data communication link between server PEP 108 and PEP 106. In this case, segment 116 is shown as incorporating a satellite link 114, however other types of high BDP segments are considered, including enterprise wide area networks (WANs) that include intercontinental optical fiber links. Segments 110, 112 and 116 may include one or more "data planes" (e.g., data plane 222 of FIG. 2), "control planes" (e.g., control plane 220 of FIG. 2) and other network devices (e.g., satellite 114) between server 104 and one or more clients such as client 102.

During operation, data exchanged between PEP 106 and client 102 may experience a round-trip packet latency Li on the client-facing segment 110 of the computer network 101. Latency Li may include the time required or expended between when PEP 106 transmits data to client 102 and when PEP 106 receives the data acknowledgment (ACK) from client 102 that client 102 received that data. The time required may be based on factors including the data communication bandwidth and round trip time (RTT) between client 102 and the availability of PEP 106 to respond. The configuration of the PEP 106 may also play a role. The PEP 106 may delay providing data to the client 102 or providing an ACK to the PEP 108 acknowledging the data until a certain amount of data has been received. Another factor may be the response time required by client 102 to provide the ACK at its output in response to receiving the data at its input.

In addition, during operation, data exchanged between PEP 108 and server 104 may experience a round-trip packet latency Lr on the server-facing segment 112 of the computer network 101. Latency Lr may include the time required or expended between when PEP 108 transmits a request for data to server 104 and when PEP 108 receives the data requested from server 104. The time required may be based on factors including the data communication bandwidth and round trip time (RTT) between server 104 and PEP 108. The configuration of the PEP 108 may also play a role. The PEP 108 may delay providing data to the client 104 or providing an ACK to the PEP 106 acknowledging the data until a certain amount of data has been received. Another factor may be the response time required by server 104 to provide the data at its output in response to receiving the request at its input.

PEP 106 includes at least five main functional components related to improving data flow control between dual ended TCP PEPs, such as PEPs 106 and 108. In some cases, these components may be combined or may be further sub-divided. These components are the TCP connection identifier 122, the TCP connection ID transmitter 123, the Latency Li measurer 124, the congestion information determiner 126, the Li and congestion information transmitter 128. These components may be, and preferably are specialized physical hardware, specially programmed to perform the functions described herein. However, these components may, in some cases, be implemented in a computing device, such as FIG. 6.

PEP 106 includes a TCP connection identifier 122 for identifying each TCP connection on a client-facing segment 110 of the network 101. The PEP 106 relies upon accurate tracking of these connections in order to appropriate manage them across the segment 116. The TCP connection identifier 122 may track the current status of the packets received on each TCP connection (e.g. which packets have been received, which have been acknowledged, which have been put into a buffer, etc.).

PEP 106 includes TCP connection identification transmitter 123 for transmitting identification of each TCP connection on a client-facing segment 110 (e.g., identified by identifier 122) to the corresponding PEP (in this case PEP 108). This transmitter 123 may include a database or buffer memory for storing identifiers associated with each TCP connection so as to track their current status.

PEP 106 includes a round-trip packet latency (Li) measurer 124 for measuring Li on the client-facing segment 110 of the network 101. This measurer 124 periodically takes measurements of the round-trip packet latency (Li) by tracking the timestamp on one or more packets received across the network 101. This measurement may be updated quite frequently (e.g. many times a second) or less frequently (e.g. once every few seconds). The frequency of updates may be dynamic based upon the number of simultaneous connections being managed and the availability of the PEP 106 to perform such functions.

PEP 106 includes a transmit buffer congestion window determiner 126 for determining transmit buffer congestion window information of PEP 106. This determiner 126 may determine the current or available transmit buffer 206 window size of the PEP 106 to the client-facing segment 110 of the network 101. The available window size is important because it determines the amount of data that may be buffered by the PEP 106 at a given time. As with the latency measurement, this determiner 126 may operate many times a second or every few seconds to determine the available buffer. And, the size of the available window may be maintained, in part, based upon the latency Li on the network 101. Specifically, a larger window may be required for adequate management, the larger the RTT delay.

PEP 106 includes a latency Li and transmit buffer congestion window transmitter 128 for transmitting across a control channel or "plane" (e.g., see control plane 220 of FIG. 2) to the PEP 108 the latency Li (e.g., determined by measurer 124) and the transmit buffer congestion window information (e.g., determined by determiner 126) for the TCP connection on the client-facing segment 110. This latency Li may be used the corresponding PEP (in this case, PEP 108) to determine its own transfer rates and to better manage congestion and flow. This is discussed more fully below.

PEP 108 includes at least seven main functional components related to improving data flow control between dual ended TCP PEPs, such as PEPs 106 and 108. In some cases, these components may be combined or may be further sub-divided. The components are the TCP connection ID receiver 131, the Li and congestion information receiver 132, the congested TCP flow determiner 134, the receive buffer window synchronizer, the acknowledgements delayer 138, the Lr measurer 140, and the throughput controller 142. These components may be, and preferably are specialized physical hardware, specially programmed to perform the functions described herein. However, these components may, in some cases, be implemented in a computing device, such as FIG. 6.

PEP 108 includes a TCP connection identification receiver 131 for receiving from across a control channel or "plane" (e.g., see control plane 220 of FIG. 2) from the PEP 106 the identification of each TCP connection on a client-facing segment 110 of the network 101. Using the TCP connection identification receiver 131, PEP 108 can identify all active connection between the server 104 and the client 102.

PEP 108 includes an Li and transmit buffer congestion window receiver 132 for receiving from across a control channel or "plane" (e.g., see control plane 220 of FIG. 2) from the PEP 106 the Li and the transmit buffer congestion window information for the TCP connection on the client-facing segment 110. This information regarding the transmit buffer congestion window may be used to better synchronize the transmit and receive transmission speeds as discussed more fully below.

PEP 108 includes a congested TCP flow determiner 134 for determining whether each TCP connection of the client-facing segment 110 has a congested TCP packet flow. The TCP flow determiner may receive the congestion information from the PEP 106 and act upon it to determine whether or not there is congestion.

PEP 108 includes a receive buffer window synchronizer 136 for synchronizing a receive buffer receive window size of the PEP2 (e.g., see receive buffer 216 of data link 120) to be the same as a transmit buffer congestion window size of the PEP1 (e.g., see transmit buffer 206 of data link 120). This is discussed more fully below, but the synchronization of the two window sizes enables the buffers to better mirror one another and to better maintain a consistent data flow rate.

PEP 108 includes an acknowledgements (ACKs) delayer 138 for delaying acknowledgments received by the PEP 108 from the PEP 106 by a time Tack. Synchronizing a receive buffer receive window size and time tack will be described further herein. For some embodiments, synchronizer 136 and delayer 138 may be part of a congestion reliever of PEP 108 that is for relieving the congestion of each TCP connection of the client-facing segment 110 having a congested TCP packet flow. Relieving by the reliever may include synchronizing and delaying as described for synchronizer 136 and delayer 138.

PEP 108 includes a round-trip packet latency (Lr) measurer 140 for measuring Lr on the server-facing segment 112 of the network 101. This measurer measures the counter-party delay to the Li latency to determine the overall RTT.

PEP 108 includes a throughput controller 142 for controlling the throughput on server-facing segment 112 proportionately to match the throughput of the flow controlled connection on client-facing segment 110. The control of the throughput from PEP 108 enables a dynamic flow control for the overall network 101 that reduces wasted bandwidth by lowering the number of timeouts, the potential for buffer overflow, and by managing the connection to take into account the capabilities of the network 101 and both the client 102 and the server 104. Controlling the throughput will be described further herein.

These main functional components 122-142 of PEPs 106 and 108 may be implemented as processors, modules or components, and may each be executed on a single processor or separate processors. These components may be implemented by any combination of hardware and/or software. These components may further include one or more elements for performing any one or combination of processes described in the embodiments. It can be appreciated that PEPs 106 and 108 may include other functional components.

In some cases, identifier 122, transmitter 123, measurer 124, determiner 126 and transmitter 128 function or perform as identified herein for each of a number of TCP connections between server 104 and one or more client such as client 102. Also, in some cases, receiver 131, receiver 132, determiner 134, synchronizer 136, delayer 138, measurer 140 and controller 142 function or perform as identified herein for each of the number of TCP connections between server 104 and one or more client such as client 102. Each of these connections may include a TCP connection between PEP 106 and a client such as client 102 on client-facing segment 110.

Figure 2:
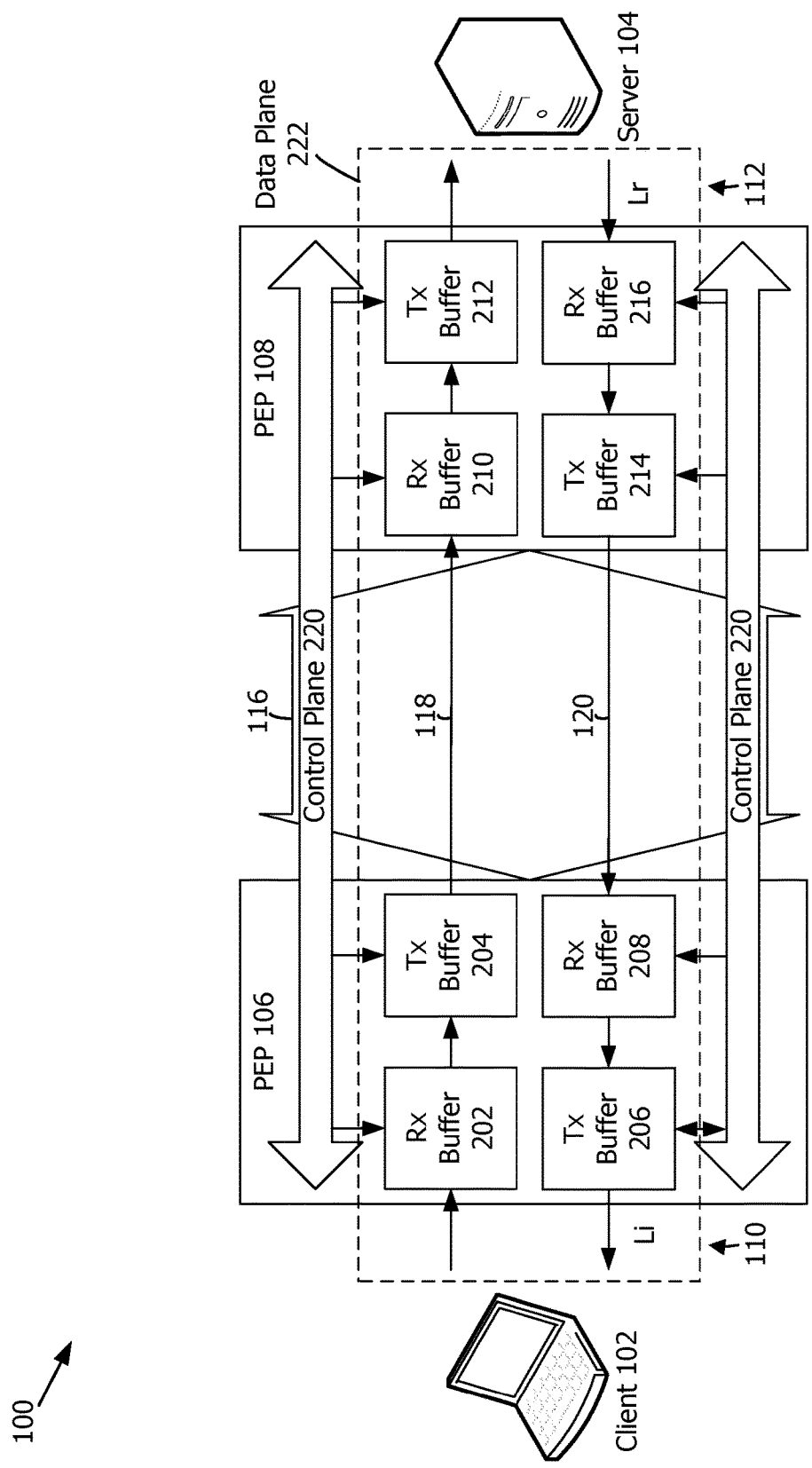
FIG. 2 is a block diagram of the system 100 shown in FIG. 1 including a data plane and a control plane.

FIG. 2 shows a block diagram of the system 100 shown in FIG. 1 including a data plane 222 and a control plane 220. FIG. 2 may further describe components and functions of PEP 106, segment 116 and PEP 108 of FIG. 1.

FIG. 2 shows PEP 106 "facing" (e.g., exchanging data with) the client 102 through or at client-facing segment 110. PEP 106 is shown including a receive buffer 202 and a transmit buffer 204, such as of link 118; and a transmit buffer 206 and a receive buffer 208 of link 120. PEP 108 is shown "facing" the server 104 through or at server-facing segment 112. PEP 108 is shown including a receive buffer 210 and a transmit buffer 212 of link 118; and a transmit buffer 214 and a receive buffer 216 of link 120.

The diagram also shows data plane 222 such as a set of channels through which data flows or is communicated between the components of system 100, such as between PEPs 106 and 108; or between client 102 and server 104. This data may be data requested by client 102 from server 104, such as content stored on the server for consumption by a user of client 102. Data plane 222 may include or exist in each of PEP 106, PEP 108, segment 110, segment 112 and segment 116. In some cases, data plane 216 includes links 118 and 120. FIG. 2 shows data plane 222 including and extending through each of buffers, 202, 204, 206, 208, 210, 212, 214 and 216, such as for writing the data into and reading the data from the buffers as shown.

In some cases, the transmit and receive buffers of the PEPs 106 and 108 may collectively form at least part of a data plane 222 for communicating data over the high BDP segment 116. The buffers may buffer data of data plane 222 according to how they are controlled by data flow control plane 220.

For example, the diagram shows control plane 220 such as a set of channels through which flow control information is communicated between the components of system 100, such as between PEPs 106 and 108. Control plane 220 may include or exist in each of PEP 106, PEP 108, segment 110, segment 112 and segment 116. FIG. 2 shows control plane 220 connected to each of buffers, 202, 204, 206, 208, 210, 212, 214 and 216, such as for controlling the writing of data into and reading of data from the buffers.

In some cases, PEPs 106 and 108 also collectively implement control plane 220 through or over the high BDP segment 116. Control plane 220 may include or use control registers and at least one dedicated control channel within the high BDP segment 116. In one instance, the registers may be able to be written to and read from by both of PEPs 106 and 108.

Control plane 220 may include or be implemented using TCP. In others it may include or be implemented using user datagram protocol (UDP). It is also contemplated that PEP 106 and 108 may use different of these protocols, and translate what is received over plane 220 from TCP and UDP (or vice versa) as required.

In one instance, as part of communicating flow control information, registers exist in PEP 106, into which data can be written by PEP 108 across control plane 220 and subsequently read by PEP 106. This may be described as PEP 108 transmitting flow control information to (or communicating with) PEP 106. Correspondingly, as part of communicating flow control information, registers exist in PEP 108, into which data can be written by PEP 106 across control plane 220 and subsequently read by PEP 108. This may be described as PEP 106 transmitting flow control information to (or communicating with) PEP 108. In other words, connection awareness exists in both PEP 106 and 108 (e.g., their engines) and each TCP connection can be identified by an identification information or number. Consequently, buffer information for each PEP can be shared with the other PEP across the control channel 220.

Although not shown, planes 220 and 222 may include additional components or structures for storing and communicating (e.g., transmitting and receiving) the data and control information. For example, the channels may have additional registers, buffers, memory, circuitry, logic and other computer components to implement in such channels.

In some instances, system 100 may include one or more TCP connections, where each TCP connection includes the combination of a data plane (e.g., data plane 222) and control plane (e.g., control plane 220) between a client 102 and a server 140, such as is shown existing in segment 110, PEP 106, segment 116, PEP 108 and segment 112. It can be appreciated that the descriptions herein can be applied to each of these TCP connections.

This system 100 provides an improved system 100 for communication over high BDP segment 116 between PEPs 106 and 108, using control plane 220 implemented between the transmission protocol (TP) at PEP 106 and the TP of PEP 108. In some cases, flow control information is exchanged in system 100 through the control plane 220 for TCP connections that experience congestion, such as congestion of data plane 222. The flow control information may include Li of PEP 106 and transmit buffer congestion window information for each TCP connection on the client-facing segment 110. The transmit buffer congestion window information may include an explicit congestion notification (ECN) and/or the transmit buffer congestion window size for each TCP connection on the client-facing segment 110.

System 100 (e.g., PEP 108) may receive flow control information from across control channel 220 including round-trip packet latency measurement (Li) on the client-facing segment 110 and transmit buffer congestion window information of buffer 206 of the PEP 106 for each TCP connection on the client-facing segment. The system 100 (e.g., PEP 108) may determine whether each TCP connection of the client-facing segment 110 has a congested TCP packet flow based on the transmit buffer congestion window information. For each TCP connection of the client-facing segment 110 determined to have congested TCP packet flow, system 100 (e.g., PEP 108) may synchronize a receive buffer receive window size of the PEP2 to be the same as a transmit buffer congestion window size of the PEP1. After synchronizing, for each TCP connection of the client-facing segment 110 determined to still have congested TCP packet flow, system 100 (e.g., PEP 108) may also delay acknowledgments (ACKs) received by the PEP2 from the PEP1 by a time Tack. In some cases, after synchronizing or delaying, it may also control throughput on server-facing network segment 112 to match that of the flow controlled (e.g., synchronized and delayed) connection on the client facing segment 110.

Description of Processes

Figure 3:
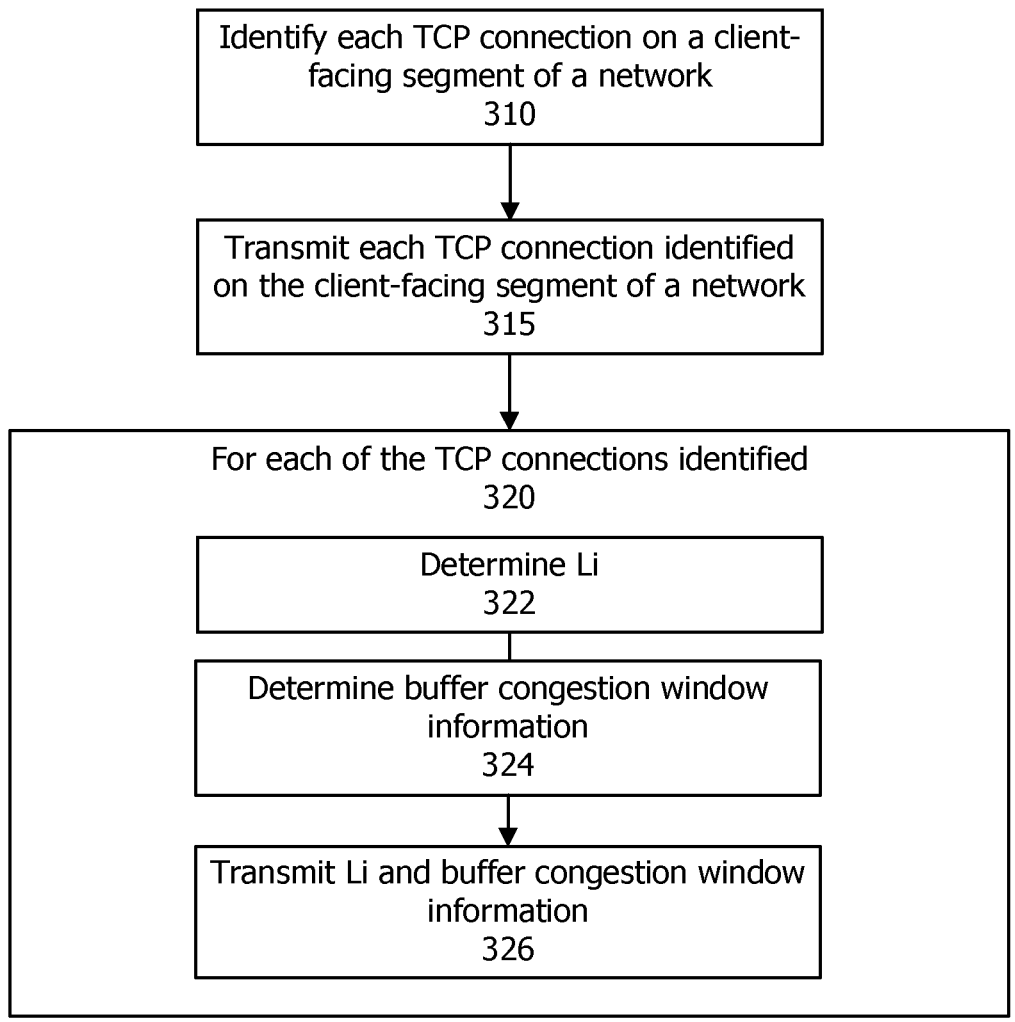
FIG. 3 is a flow chart of a process 300 for identifying TCP connections and transmitting information used for improving data flow control between dual ended TCP PEPs.

For example, FIG. 3 shows a flow chart of a process 300 for identifying TCP connections and transmitting information used for improving data flow control between dual ended TCP PEPs. Process 300 may be a process performed by system 100, such as by PEP 106. The process 300 starts at 310 and ends at 326. The process 300 may be initiated by the system or PEP upon performance of identifications at 310 or upon determination at 322. Many instances of the process 300 may run concurrently. Instances of process 320 may repeat for each TCP connection on client-facing segment 110 as described herein. The processes 300 and 320 may repeat or recur any number of times.

At 310, each TCP connection on a client-facing segment 110 of a network 101 is identified. This may include PEP 106 identifying each TCP connection to a client such as client 102 that PEP 106 is providing data to (and receiving data from) via or across client-facing segment 110. In some case, each TCP connection on client-facing segment 110 identified at 310 is identified by three tuples. The three tuples may be or include: 1) source and destination IP address; 2) source and destination port; and 3) protocol and VLAN. Here, VLAN may refer to a virtual LAN, which may include a broadcast domain that is partitioned and isolated in a computer network at the data link layer. Identifying at 310 may be done by and as described for the TCP connection identifier 122 of FIG. 1.

At 315, identification of each TCP connection on a client-facing segment 110 of a network 101 is transmitted. This may include PEP 106 transmitting the identification of each TCP connection identified at 310 across control plane 220, such as to PEP 108. This may be done by and as described for the TCP connection identification transmitter 123 of FIG. 1.

Upon, or shortly after, the identification(s) at 310, at 320, for each TCP connection identified, determinations at 322-324 and transmission at 326 are performed by system 100 or PEP 106. Determinations at 322-324 may occur before or after transmission at 315. Transmission at 326 may occur after transmission at 315.

At 322, Li is determined. This may include PEP 106 measuring Li at or across client-facing segment 110 of the network 101 for one TCP connection (e.g., one of each of the TCP connections) identified at 310. This may be done by and as described for round-trip packet latency (Li) measurer 124 of FIG. 1.

At 324, transmit buffer congestion window information is determined. This may include PEP 106 measuring transmit buffer congestion window information of PEP 106. Here, for example, PEP 106 may measure the current available window size or buffer size of buffer 206 at client-facing segment 110 of the network 101 for the one TCP connection identified at 310. This may be done by and as described for transmit buffer congestion window determiner 126 of FIG. 1.

The transmit buffer congestion window information may include an explicit congestion notification (ECN) or the transmit buffer congestion window size for the one TCP connection identified at 310. In some instances, congestion conditions of data plane 222 are identified by PEP 106 or 108 examining the transmit buffer window size of buffer 206 or 212, respectively, according to an ECN standard for each TCP connection at face 110. If congestion conditions exist in buffer such as by the current available size of the buffer being less than a predetermined or configurable threshold, PEP 106 or 108 can transmit an ECN or the transmit buffer congestion window size of buffer 206 or 212 to the other PEP.

In some instances, the transmit buffer congestion window information is or includes the ECN field in the IP headers of information in the TCP connections, such as ECN field information identifying a congested transmit buffer of PEP 106 at segment 110. In other instances, the transmit buffer congestion window information is or includes the transmit buffer congestion window size in the TCP connections, such a window size identifying a congested transmit buffer of PEP 106 at segment 110. For example, congestion conditions of data plane 222 can be identified by PEP 106 or PEP 108 examining their buffers, such as buffer 206 or 212, respectively, to determine if those buffers are congested or are currently filled with an amount of data that is greater than a predetermined or configurable threshold.

In either instance, congestion conditions of data plane 222 can be identified by the upstream or downstream systems examining the messages or field in the information they receive in the TCP connections or in control plane 222 from the upstream or downstream systems, respectively. For instance, if PEP 106 or PEP 108 determines it has a congested buffer, it can send a message to the other PEP with these messages or fields indicating the congestion condition, and the other PEP can examine that message to determine that the TCP connection is congested.

Notably, upon, or shortly after, the determinations at 322 and 324, at 326, the Li and the transmit buffer congestion window information are transmitted across the control channel to the PEP 108. This may include PEP 106 transmitting the Li determined at 322 and the transmit buffer congestion window information determined at 324 to the PEP 108 across the control channel 220 of a TCP connection, for the one TCP connection identified at 310. This may be done by and as described for Li and transmit buffer congestion window transmitter 128 of FIG. 1.

After the transmission at 326, the process 320 (determinations at 322-324 and transmission at 326) may end for the one TCP connection identified at 310. It can be appreciated that the process 320 may be repeated for each TCP connection identified at 310 and may be repeated periodically, as necessary, to update the TCP connections that are active and then to determine their respective Li and congestion window information for transmission.

After 326, the Li and the transmit buffer congestion window information transmitted across the control channel 220 can be used by system 100 or PEP 108 to improve data flow control between dual ended TCP PEP.

Figure 4:
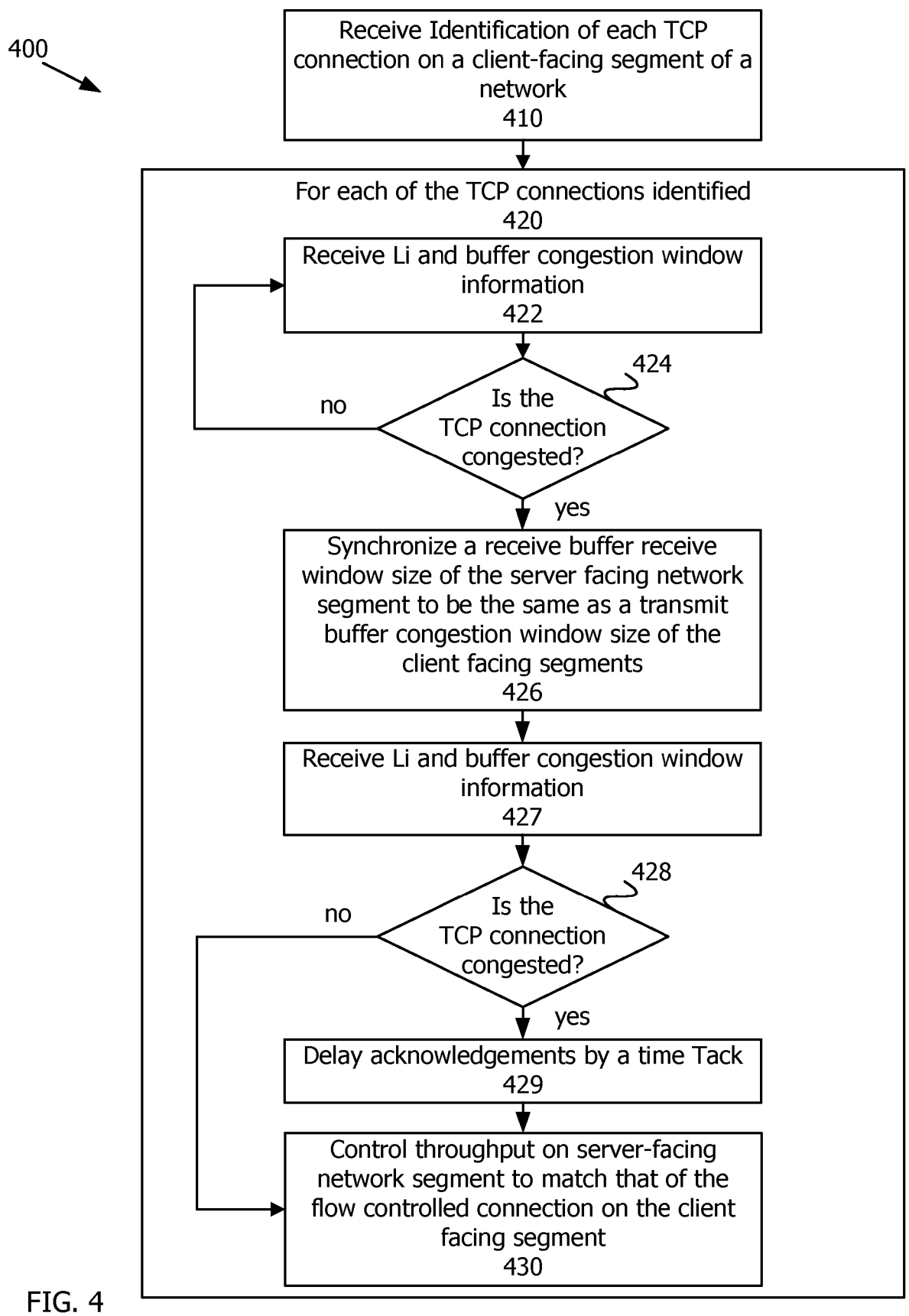
FIG. 4 is a flowchart of a process 400 for improving data flow control between dual ended TCP PEPs.

FIG. 4 shows a flowchart of a process 400 for improving data flow control between dual ended TCP PEPs. Process 400 may be a process performed by system 100, such as by PEP 108. The process 400 starts at 410 and ends at 430. The process 400 may be initiated by the system or PEP upon receipt of identification at 410 or upon receipt of information at 422. In some cases, the process 400 may be initiated by or may occur following process 300 such as following 326. Many instances of the process 400 may run concurrently. Instances of process 420 may repeat for each TCP connection on client-facing segment 110 as described herein. The process 400 and 420 may repeat or recur any number of times.

At 410, identification of each TCP connection on a client-facing segment 110 of a network 101 is received. This may include PEP 108 receiving the identification of each TCP connection across control plane 220, such as from PEP 106. This may be done by and as described for TCP connection identification receiver 131 of FIG. 1. In some cases, receiving at 410 includes receiving each TCP connection identified on the client-facing segment identified at 310; and transmitted at 315.

Upon, or shortly after, receiving the identification(s) at 410, at 420, for each TCP connection identified, processes 422-430 are performed by system 100 or PEP 108.

At 422, Li and buffer congestion window information is received. This may include PEP 108 receiving the Li and the buffer congestion window information across control plane 220 of a TCP connection, such as from PEP 106 for one TCP connection (e.g., one of each of the TCP connections) identified as received at 410. This may be done by and as described for Li and transmit buffer congestion window information receiver 132 of FIG. 1.

In some cases, receiving at 422 includes receiving the Li and the transmit buffer congestion window information determined at 322 and 324; and transmitted at 326. For example, the received transmit buffer congestion window information may include an explicit congestion notification (ECN) or the transmit buffer congestion window size for each TCP connection on the client-facing segment 110.

According to embodiments, the combination of round-trip packet latency measurement (Li) on the client-facing segment and transmit buffer congestion window information of the PEP 106, such as of buffer 206, may be described as "flow control information." In some cases, the combination of at least the Li and the buffer congestion window information, such as described at 128, 132-134, 324-326 and 422-424 may be described as "flow control information." In some cases, such "flow control information" also includes the ECN, which may indicate whether PEP 106 or buffer 206 is congested. According to some embodiments, the flow control information may be exchanged through the control plane 220, such as from PEP 106 to PEP 108, for each of the TCP connections of data plane 222.

At 424, it is determined whether the TCP connection is congested. This may include PEP 108 determined whether the TCP connection for which flow control information is received at 422 is congested for the one TCP connection identified as received at 410. This may be done by and as described for congested TCP flow determiner 134 of FIG. 1. This may be performed by system 100 or PEP 108.

In some instances, PEP 108 may receive and inspect (e.g., examine) the transmit buffer congestion window information to determine whether a TCP connection is congested at 424. In one case, the system 100 (e.g., PEP 108) may determine whether each TCP connection of the client-facing segment 110 has a congested TCP packet flow based on the ECN information received at 422. This may be the information in the ECN field in the IP headers of information in the TCP connections, such as ECN field information identifying a congested transmit buffer of PEP 106 at segment 110 as described at 324. In another case, the system 100 (e.g., PEP 108) may determine whether each TCP connection of the client-facing segment 110 has a congested TCP packet flow based on the transmit buffer congestion window size in the TCP connections received at 422. This window size may be a size identifying a congested transmit buffer of PEP 106 at segment 110 as described at 324.

In some cases, determining at 424 includes determining based at least on an explicit congestion notification (ECN) received for each TCP connection on the client-facing segment 112, such as where the ECN indicates that the current available transmit buffer 206 window size is below a congestion threshold. In some cases, determining 424 includes determining based an explicit congestion notification (ECN) received in an IP header of the one TCP connection identified as received at 410. An ECN may refer to an explicit congestion notification, an extension to the Internet protocol (IP) and to the transmission control protocol (TCP) defined in RFC 3168 (Request for Comments: 3168, Network Working Group, The Internet Society, K. Ramakrishnan, September 2001, "The Addition of Explicit Congestion Notification (ECN) to IP"). In some cases, an ECN will be identified in two dedicated bits in the IP header. ECN enables end-to-end notification of network congestion without dropping packets.

In some embodiments, a congested TCP flow is determined (e.g., identified) when transmit buffer 206 is indicated as having a current available window size that is less than a certain percent of the maximum window size of buffer 206. In some cases, the percentage is configurable, such as based on the current BDP of the WAN link, which is segment 116 here. That is, the percentage can be set by system 100 or plane 220 to a lower value or a higher value based on the BDP of segment 116; or of links 118 and 120.

It is possible for a congested TCP flow to be indicated by having a current available window size that is less than between 5 and 40 percent of the maximum window size of buffer 206. In some cases, a congested TCP flow may be indicated by having a current available window size that is less than between 10 and 20 percent of the maximum window size of buffer 206. In some instances, it may be less than 10 or 15 percent of the maximum. In one case it may be less than 10 percent.

If at 424 it is determined that the one TCP connection is not congested, process 400 returns to 422 where flow control information (e.g., Li, buffer congestion window information, and optionally ECN) for another one of the TCP connections is received.

If at 424 it is determined that the one TCP connection is congested, process 400 continues to process 426. In some cases, process 426, 429 and 430 may describe updating TCP connection parameters corresponding to the flow control information received at 422 and 427.

For certain embodiments 424 is optional and not performed. In this case, 426 occurs after 422, such as to size the buffer receive window size whether or not there would have been congestion (e.g., at 424).

At 426 a receive buffer receive window size of the server facing network segment is synchronized to be the same as a transmit buffer congestion window size of the client facing segment. This may include PEP 108 synchronizing the window size of the receive buffer 216 receive window size on server facing network segment 112 to be the same window size as that of the transmit buffer 206 congestion window size of the client facing segment 110 for the one TCP connection identified as received at 410. This may be done by and as described for receive buffer window synchronizer 136 of FIG. 1.

In some cases, synchronizing at 426 includes setting the receive buffer 216 receive window size of the PEP 108 to be whichever is smaller (e.g., the minimum) of the transmit buffer 206 current and congested window size of the PEP 106 and the receive buffer 216 receive window size of the PEP 108. This may be performed by system 100 or PEP 108. In this case traffic from PEP 106 to client 102 is throttled. For example, here, PEP system 108 would throttle back by advertising lower TCP receive window size (e.g., the synchronized size) to server 104.

At 427, Li and buffer congestion window information is received. This may include PEP 108 receiving the Li and the buffer congestion window information across control plane 220 of a TCP connection, such as from PEP 106 for one TCP connection (e.g., one of each of the TCP connections) identified as received at 410. This may be done by and as described at 422. At 427, Li and the buffer congestion window information may be different than they were at 422 due to synchronizing at 426. In some cases, at 427, Li and the buffer congestion window information may be less than at 422 due to the throttling at 426.

At 428, it is determined whether the TCP connection is congested. This may include PEP 108 determined whether the TCP connection for which flow control information is received at 427 is congested for the one TCP connection identified as received at 410. This may be done by and as described at 424. At 428, whether or not the TCP connection is congested may be a different answer than it was at 424 due to synchronizing at 426. In some cases, at 428, the TCP connection may be less likely to be congested than at 424 due to the throttling at 426.

If at 428 it is determined that the one TCP connection is not congested, process 400 continues to 430.

If at 428 it is determined that the one TCP connection is congested, process 400 continues to process 429. In this case, it may be that synchronizing at 426 did not sufficiently reduce the congestion of or caused the window size to become choppy of the TCP connection that was congested at 424. Thus, embodiments consider taking additional action to relieve the congestion of the TCP connection if it is still congested at 428.

For example, at 429 the system can be configured to delays ACKs. At 429 acknowledgments (ACKs) received by the PEP 108 from the PEP 106 are delayed by a time Tack before being sent to server 104. This may include PEP 108 delaying the ACKs by a time Tack before transmitting them on server-facing segment 112 to server 104 for the one TCP connection identified as received at 410. This may be done by and as described for acknowledgments delayer 138 of FIG. 1.

In some cases, delaying at 429 includes setting Tack to ½ Li when Li is less than a preset threshold level Tlim; and setting Tack to ½ Tlim when Li is greater than or equal to the preset threshold level Tlim. In this case, Tlim may be between 200 and 700 milliseconds (ms). In some cases, Tlim is between 300 and 500 ms. In some instances, it is between 350 and 450 ms. In one instance, it is 400 ms+/−10 percent. This may be performed by system 100 or PEP 108.

For some embodiments, Tlim may be a configurable threshold (e.g., in real time) such as dependent upon the round-trip delay time (e.g., RTT, in seconds) of segment 116. It may be Tlim=½ RTT of high BDP segment 116. For some embodiments, Tlim may be a configurable threshold, such as dependent upon the type of satellite of satellite 114. It may be Tlim=400 ms when satellite 114 is a geostationary Earth orbit (often referred to as geosynchronous equatorial orbit) (GEO) satellite, and may be Tlim=600 ms when satellite 114 is a medium Earth orbit (MEO) satellite.

For some embodiments, the system 100 or PEP 108 may be configured to delays ACKs no more than time Tmax. Tmax can be configured based on LAN end point TCP implementations. In these embodiments, Tack can not be greater than Tmax; or Tack≤Tmax. Tmax may be a configurable maximum delay of the ACKs that is based on the TCP environment. In some cases, Tmax is configurable based on the TCP stack and/or a lowest common denominator of endpoints of the TCP environment. The endpoints may be endpoints of the BSD. They may also be endpoints of the current BDP of the WAN link, which is segment 116 here. It is considered that Tmax may be between 1 and 400 ms. In some cases it may be between 20 and 200 ms. In some instances, it is between 50 and 150 ms. In one instance, it is 50 ms+/−10 percent. In one instance, it is 200 ms+/−10 percent.

For some embodiments, synchronizing at 426 and delaying at 429 may be part of a congestion relief process performed by system 100 or PEP 108 that relieves the congestion of each TCP connection of the client-facing segment 110 having a congested TCP packet flow. In this case, the relieving process may include relieving by the reliever as described for FIG. 1.

At 430 the throughput on server-facing segment 112 is controlled proportionately to match the throughput of the flow controlled connection on client-facing segment 110. This may include PEP 108 setting the throughput on server-facing segment 110 of network 100 to be equal to a function of receive buffer 216 receive window size of the server-facing network segment 112, Li of segment 110 and Lr of segment 112 for the one TCP connection identified as received at 410. In some cases, controlling the throughput at 430 includes taking care or ensuring that in system 100, this control does not override delayed ACKs feature implemented as per RFC 1122 (Request for Comments: 1122, Network Working Group, Internet Engineering Task Force, R. Braden, Editor, October 1989) in some TCP implementations. Controlling at 430 may be done by and as described for setter 139 of FIG. 1.

In some cases, setting at 430 includes setting the throughput on server-facing segment 110 of the PEP 108 to be a function of receive buffer 216 receive window size and whichever is smaller (e.g., the minimum) of the Li and Lr. This may be performed by system 100 or PEP 108.

After the setting at 430, the process 420 (processes 422-430) may end for the one TCP connection identified as received at 410. It can be appreciated that the process 420 may be repeated for each TCP connection identified as received at 410.

In some embodiments, receiving at 410, receiving at 422, determining at 424 and setting at 430 are optional and are not performed. Receiving at 410, receiving at 422 and setting at 430 may be optional and are not performed. In some embodiments, receiving at 410 is optional and not performed.

In some cases, part of improving data flow control between dual ended TCP PEP may include relieving the congestion of a TCP connection of the client-facing segment having a congested TCP packet flow.

Figure 5:
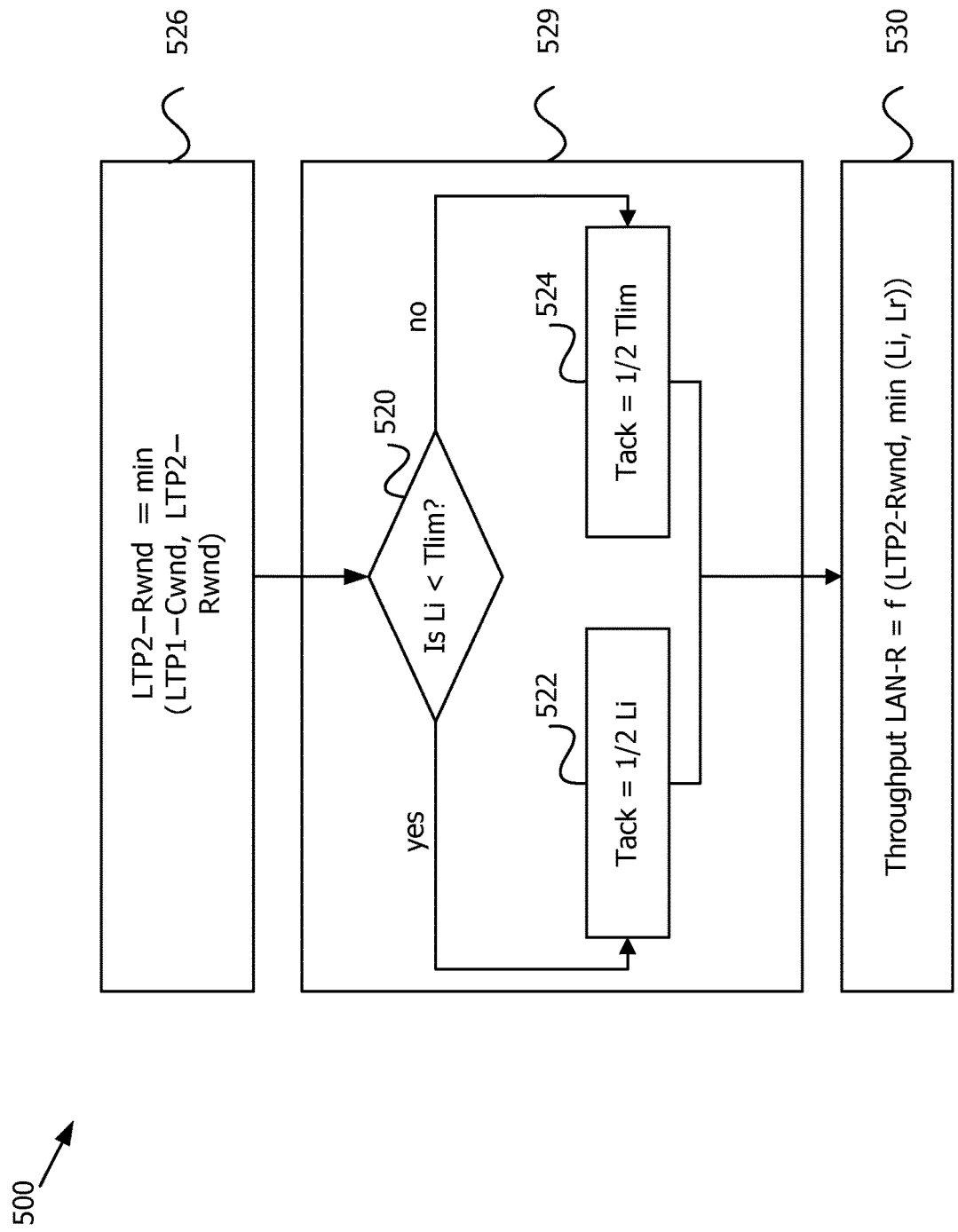
FIG. 5 is a flowchart of a process 500 for relieving the congestion of a TCP connection of the client-facing segment having a congested TCP packet flow.

For example, FIG. 5 shows a flowchart of a process 500 for relieving the congestion of a TCP connection of the client-facing segment 110 having a congested TCP packet flow. Process 500 may be a process that includes synchronizing at 526, delaying at 529 and setting at 530 which are embodiments of corresponding synchronizing at 426, delaying at 429 and setting at 430 as noted above, respectively. It may be performed by system 100, such as by PEP 108. The process 500 starts at 526 and ends at 530. In some cases, process 500 may describe updating TCP connection parameters corresponding to the flow control information received at 422 and 427.

In this embodiment, at 526 a receive buffer 216 receive window size of the server facing network segment "LTP2-Rwnd" is synchronized to be the same as a transmit buffer 206 congestion window size of the client facing segment "LTP1-Cwnd" using the equation:

$$LTP2\text{-}Rwnd = \min(LTP1\text{-}Cwnd, LTP2\text{-}Rwnd)$$

Where "min" indicates selection of the minimum (e.g., least or whichever is smaller) of the window size value between LTP2-Rwnd and LTP1-Cwnd. This may be or be part of synchronizing at 426.

At 529 ACKs to server 104 are delayed by a time "Tack," which is based at least on one of a preset threshold level "Tlim" and Li. Delaying at 529 is shown including determining at 520; and setting Tack at 522 or at 524.

At 520, it is determined whether Li is less than Tlim using the equation:

$$Li < Tlim$$

Where "Tlim" is a threshold, such as a latency limit selected prior to process 420 or 500. For certain embodiments, Tlim may be predetermined or configurable as noted at 429. In some cases, Tlim may be set as described at 429. This may be or be part of delaying at 429.

If at 520 it is determined that Li is less than Tlim, process 500 continues to 522 where Tack is set to be one half of Li using the equation:

$$Tack = \tfrac{1}{2} Li$$

Where "Tack" may be the time delaying at 429.

If at 520 it is determined that Li is not less than Tlim, process 500 continues to 524 where Tack is set to be one half of Tlim using the equation:

$$Tack = \tfrac{1}{2} Tlim$$

Where "Tack" may be the time delaying at 429. In some cases, at 529, the system 100 or PEP 108 may be configured to delays ACKs no more than time Tmax as described at 429.

After 522 or 524, process 500 continues to 530 where throughput on server-facing segment 110 of network 100 "Throughput LAN-R" is controlled proportionately to match the throughput of the flow controlled connection on the client facing segment 110 using the equation:

$$\text{Throughput } LAN\text{-}R = f(LTP2\text{-}Rwnd, \min(Li, Lr))$$

Where "f" is a function of receive buffer 216 receive window size, the Li and Lr; and "min" indicates selection of the minimum (e.g., least or whichever is smaller) of the latency delay value between Li and Lr. This may be or be part of setting at 430.

After the setting at 530, the process 500 may end for the one TCP connection identified as received at 410. It can be appreciated that the process 500 may be repeated for each TCP connection identified as received at 410.

In some embodiments, setting at 530 is optional and not performed.

FIG. 6 is an example block diagram of a computing device 600 that may incorporate embodiments of the present invention. Computing device 600 may be representative of the server 104, PEP 108, PEP 106 and client 102, herein. The computing device 600 may be, for example, a desktop or laptop computer, a server computer, a tablet, a smartphone or other mobile device. The computing device 600 may include software and/or hardware for providing functionality and features described herein. The computing device 600 may therefore include one or more of: logic arrays, memories, analog circuits, digital circuits, software, firmware and processors. The hardware and firmware components of the computing device 600 may include various specialized units, circuits, software and interfaces for providing the functionality and features described herein. For example, a global positioning system (GPS) receiver or similar hardware may provide location-based services.

The computing device 600 has a processor 610 coupled to a memory 612, storage 614, a network interface 616 and an I/O interface 618. The processor 610 may be or include one or more microprocessors, field programmable gate arrays (FPGAs), application specific integrated circuits (ASICs), programmable logic devices (PLDs) and programmable logic arrays (PLAs).

The memory 612 may be or include RAM, ROM, DRAM, SRAM and MRAM, and may include firmware, such as static data or fixed instructions, BIOS, system functions, configuration data, and other routines used during the operation of the computing device 600 and processor 610. The memory 612 also provides a storage area for data and instructions associated with applications and data handled by the processor 610. As used herein the term "memory" corresponds to the memory 612 and explicitly excludes transitory media such as signals or waveforms.

The storage 614 provides non-volatile, bulk or long-term storage of data or instructions in the computing device 600. The storage 614 may take the form of a magnetic or solid state disk, tape, CD, DVD, or other reasonably high capacity addressable or serial storage medium. Multiple storage devices may be provided or available to the computing device 600. Some of these storage devices may be external to the computing device 600, such as network storage or cloud-based storage. As used herein, the terms "storage" and "storage medium" correspond to the storage 614 and explicitly exclude transitory media such as signals or waveforms. In some cases, such as those involving solid state memory devices, the memory 612 and storage 614 may be a single device.

The network interface 616 includes an interface to a network such as network 101, segment 110, segment 112 and segment 116 (FIG. 1). The network interface 616 may be wired or wireless.

The I/O interface 618 interfaces the processor 610 to peripherals (not shown) such as displays, video and still cameras, microphones, keyboards and USB devices.

In some cases, storage 614 is a non-volatile machine-readable storage medium that includes all types of computer readable media, including magnetic storage media, optical storage media, and solid state storage media. It should be understood that the software can be installed in and sold with system 100, PEP 106 and 108. Alternatively the software can be obtained and loaded into system 100, PEP 106 and 108, including obtaining the software via a disc medium or from any manner of network or distribution system, including, for example, from a server owned by the software creator or from a server not owned but used by the software creator. The software can be stored on a server for distribution over the Internet, for example.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives.

For example, this document includes descriptions for congestion conditions of data plane 222 that are identified by upstream systems, such as by PEP 108 examining the transmit buffer congestion window information it receives in the TCP connections from PEP 106; and synchronizing, delaying and controlling congested connections. However, it can be appreciated that the same concepts apply for congestion conditions of data plane 222 that are identified by downstream systems, such as by PEP 106 examining the transmit buffer congestion window information it receives in the TCP connections from PEP 108; and synchronizing, delaying and controlling congested connections. For example, in this case, PEP 108 could perform process 300 at 310-315 for TCP connections of server-facing segment 112; and for each connection, perform 320 to transmit Lr and buffer congestion window information for Tx buffer 212. Then, based on that information, PEP 106 could perform process 400 to synchronize Rx buffer 202 to be the minimum of buffer 202 and Tx buffer 212 at 426. This may include PEP 106 synchronizing the window size of the receive buffer 202 receive window size on client facing network segment 110 to be the same window size as that of the transmit buffer 212 congestion window size of the server facing segment 112 for the one TCP connection on segment 112 identified as received at 410. If at 427 there is congestion after synchronizing at 426, PEP 106 could delay ACKs to client 102 by time Tack at 429. This may include PEP 106 delaying the ACKs by a time Tack before transmitting them on client-facing segment 110 to client 102 for the one TCP connection on segment 112 identified as received at 410. Throughput could be controlled for client facing network segment 110 to be equal to a function of receive buffer receive window size of the client-facing network segment, Li and Lr at 430. This may include PEP 106 setting the throughput on client-facing segment 112 of network 100 to be equal to a function of receive buffer 202 receive window size of the client-facing network segment 110, Li of segment 110 and Lr of segment 112 for the one TCP connection on segment 112 identified as received at 410. In other words, the same concepts described for upstream systems would apply to downstream systems by switching the role of server 104 with client 102, PEP 108 with PEP 106; segment 110 with segment 112; and Lr with Li.

In addition, although FIGS. 1-2 show a single control plane 220 and data plane 222 it can be appreciated that the concepts described herein for those planes can be expanded to multiple of each plane applied to multiple TCP connections between multiple servers such as server 104 and multiple clients such as client 102 of each of those servers. Here, each PEP can examine the transmit buffer congestion window information it receives in each TCP connection from the other PEP for the other PEP's facing segment; and synchronize, delay and control congested connections in either direction, as described herein.

With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for controlling data flow across a computer network comprising a first performance enhancing proxy device (PEP1) on a client-facing segment of the network and a second performance enhancing proxy device (PEP2) on a server-facing segment of the network, the system comprising:
the PEP2, the PEP2 including:
a receiver for receiving flow control information from across a control channel between the PEP1 and the PEP2, the flow control information including round-trip packet latency measurement (Li) on the client-facing segment and transmit buffer congestion window information of the PEP1, wherein the flow control information is for each TCP connection on the client-facing segment;
a determiner for determining whether each TCP connection of the client-facing segment has a congested TCP packet flow; and
a congestion reliever for relieving the congestion of each TCP connection of the client-facing segment having a congested TCP packet flow, the congestion reliever comprising:
a synchronizer for synchronizing a receive buffer receive window size of the PEP2 to be the same as a transmit buffer congestion window size of the PEP1;
a measurer for measuring a round-trip packet latency Lr on the server-facing segment of the computer network; and
a throughput setter for setting the throughput of the server facing segment of the PEP2 to be a function of the receive buffer receive window size of the PEP2 and whichever is smaller of the Li and Lr.

2. The system of claim 1, wherein the synchronizer synchronizing comprises:
setting the receive buffer receive window size of the PEP2 to be whichever is smaller of the transmit buffer congestion window size of the PEP1 and the receive buffer receive window size of the PEP2.

3. The system of claim 1, wherein the determiner determining comprises determining based at least on the transmit buffer congestion window information; and
wherein the transmit buffer congestion window information comprises at least one of an explicit congestion notification (ECN) received by the receiver for each TCP connection on the client-facing segment or the transmit buffer congestion window size.

4. The system of claim 1, the PEP1 comprising:
an identifier for identifying each TCP connection;
a measurer for measuring the round-trip packet latency measurement Li;
determiner for determining the transmit buffer congestion window information; and
a transmitter for transmitting the Li and the transmit buffer congestion window information for the TCP connection across the control channel to the PEP2.

5. A non-transitory machine-readable storage medium storing a program having instructions which when executed by a processor will cause the processor to:
receive flow control information from across a control channel between the PEP1 and the PEP2, the flow control information including round-trip packet latency measurement (Li) on the client-facing segment and transmit buffer congestion window information of the PEP1, wherein the flow control information is for each TCP connection on the client-facing segment;
determine whether each TCP connection of the client-facing segment has a congested TCP packet flow; and
for each TCP connection of the client-facing segment having a congested TCP packet flow, synchronize a receive buffer receive window size of the PEP2 to be the same as a transmit buffer congestion window size of the PEP1;
determine a round-trip packet latency Lr on the server-facing segment of the computer network; and
set the throughput of the server facing segment of the PEP2 to be a function of the receive buffer receive window size of the PEP2 and whichever is smaller of the Li and Lr.

6. The non-transitory machine-readable storage medium of claim 5, wherein synchronizing comprises:
setting the receive buffer receive window size of the PEP2 to be whichever is smaller of the transmit buffer congestion window size of the PEP1 and the receive buffer receive window size of the PEP2.

7. The non-transitory machine-readable storage medium of claim 5, wherein determining comprises determining based at least on the transmit buffer congestion window information; and
wherein the transmit buffer congestion window information comprises at least one of an explicit congestion notification (ECN) received by the receiver for each TCP connection on the client-facing segment or the transmit buffer congestion window size.

8. The non-transitory machine-readable storage medium of claim 5, wherein the program having instructions which when executed by a processor will further cause the processor to:
identify each TCP connection;
determine the round-trip packet latency measurement Li;
determine the transmit buffer congestion window information; and
transmit the Li and the transmit buffer congestion window information for the TCP connection across the control channel to the PEP2.

9. A data flow control process across a computer network comprising a first performance enhancing proxy device (PEP1) on a client-facing segment of the network and a second performance enhancing proxy device (PEP2) on a server-facing segment of the network, the flow control process comprising:
receiving flow control information from across a control channel between the PEP1 and the PEP2, the flow control information including round-trip packet latency measurement (Li) on the client-facing segment and transmit buffer congestion window information of the PEP1, wherein the flow control information is for each TCP connection on the client-facing segment;

determining whether each TCP connection of the client-facing segment has a congested TCP packet flow; and for each TCP connection of the client-facing segment having a congested TCP packet flow, synchronizing a receive buffer receive window size of the PEP2 to be the same as a transmit buffer congestion window size of the PEP1;

determining a round-trip packet latency Lr on the server-facing segment of the computer network; and setting the throughput of the server facing segment of the PEP2 to be a function of the receive buffer receive window size of the PEP2 and whichever is smaller of the Li and Lr.

10. The flow control process of claim 9, wherein synchronizing comprises:

setting the receive buffer receive window size of the PEP2 to be whichever is smaller of the transmit buffer congestion window size of the PEP1 and the receive buffer receive window size of the PEP2.

11. The flow control process of claim 9, wherein determining whether each TCP connection of the client-facing segment has a congested TCP packet flow is based at least on the transmit buffer congestion window information; and wherein the transmit buffer congestion window information comprises at least one of an explicit congestion notification (ECN) received by the receiver for each TCP connection on the client-facing segment or the transmit buffer congestion window size.

12. The flow control process of claim 9, further comprising:

identifying each TCP connection;

determining the round-trip packet latency measurement Li;

determining the transmit buffer congestion window information; and transmitting the Li and the transmit buffer congestion window information for the TCP connection across the control channel to the PEP2.

* * * * *